United States Patent
Harguess et al.

(10) Patent No.: US 10,262,224 B1
(45) Date of Patent: Apr. 16, 2019

(54) OPTICAL FLOW ESTIMATION USING A NEURAL NETWORK AND EGOMOTION OPTIMIZATION

(71) Applicant: THE UNITED STATES OF AMERICA AS REPRESENTED BY THE SECRETARY OF THE NAVY, Washington, DC (US)

(72) Inventors: Joshua D. Harguess, San Diego, CA (US); Christopher M. Barngrover, San Diego, CA (US); Amin M. Rahimi, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 28 days.

(21) Appl. No.: 15/654,573

(22) Filed: Jul. 19, 2017

(51) Int. Cl.
  *G06K 9/32* (2006.01)
  *G08B 13/196* (2006.01)
  *G06K 9/00* (2006.01)

(52) U.S. Cl.
  CPC ....... *G06K 9/3241* (2013.01); *G06K 9/00624* (2013.01); *G06K 9/3233* (2013.01); *G08B 13/19608* (2013.01); *G06T 2207/10021* (2013.01)

(58) Field of Classification Search
  None
  See application file for complete search history.

(56) References Cited

U.S. PATENT DOCUMENTS

| | | | |
|---|---|---|---|
| 8,422,741 B2 | 4/2013 | Eggert et al. | |
| 2003/0117611 A1* | 6/2003 | Chon | G06T 7/20 356/5.01 |
| 2015/0271548 A1* | 9/2015 | Daub | H04N 21/44008 725/12 |
| 2017/0372137 A1* | 12/2017 | Kumar | G06K 9/00657 |
| 2018/0161986 A1* | 6/2018 | Kee | G06K 9/00664 |

* cited by examiner

Primary Examiner — Qian Yang
(74) Attorney, Agent, or Firm — NIWC Pacific; Kyle Eppele; Ryan J. Friedl

(57) ABSTRACT

A camera is connected to a trained neural network. The camera takes an image of a scene and transmits the image to the neural network. A processor connected to the neural network has a localization filter and a robot model implemented therein. A global positioning system (GPS) receiver and inertial measurement unit (IMU) transmit GPS information and IMU information, respectively, to the processor. The localization filter filters the received GPS and IMU information and inputs the filtered information into the robot model. The robot model outputs current position information corresponding to the current image and previous position information corresponding to the respective one or more previous images. The neural network uses the current image and associated current position information and the one or more previous images and respective associated previous position information to generate an estimated optical flow image, which is transmitted to an object detection system.

18 Claims, 3 Drawing Sheets

OPTICAL FLOW ESTIMATION USING A NEURAL NETWORK AND EGOMOTION OPTIMIZATION

FEDERALLY SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 105203.

BACKGROUND

Research in the area of motion detection from images has generally been focused on the use of a static camera and improved pixel level optical flow. When an active camera is used, i.e. one that is moving, motion detection is more difficult because the motion of the camera must be factored into consideration. Attempts have been made to compensate for a camera's motion by first addressing the camera movement and then by directly attempting to find salient motion relative to the camera motion. Limitations of the current methods include the false identification of the background motion resulting from the active camera as a target or the targets being ignored and lost in the noise of the camera motion. Further, in the presence of video degradation such as noise, compression artifacts, and reduced frame rates, the performance of state-of-the-art optical flow algorithms greatly diminishes, resulting in extremely slow algorithms that are not suitable for real-time analysis. A need exists for an improved system and method for detecting motion of moving objects using a moving camera.

DETAILED DESCRIPTION OF SOME EMBODIMENTS

Figure 1:
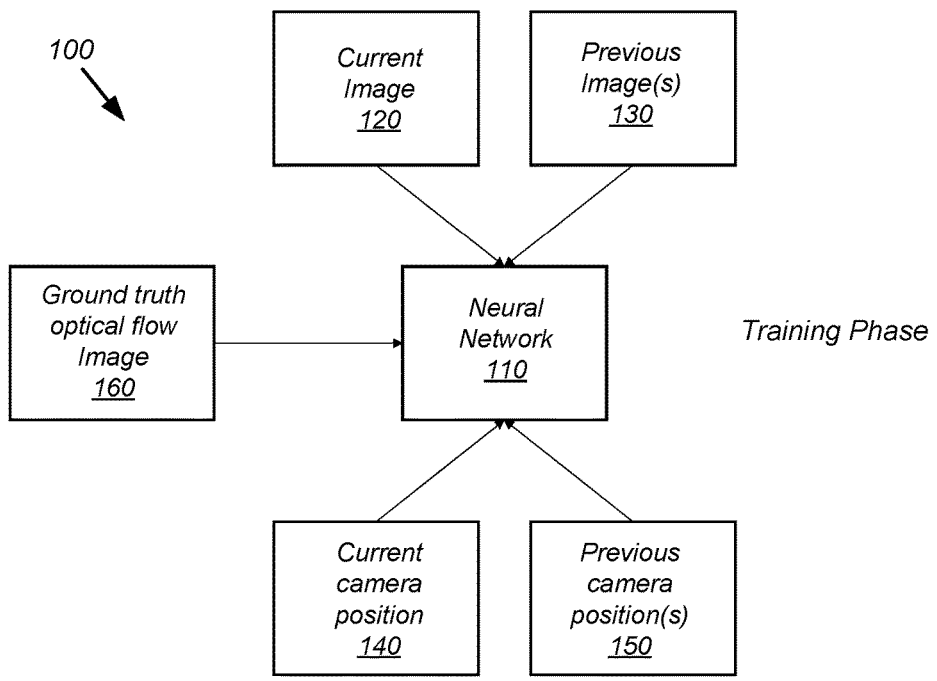
FIG. 1 shows a flowchart illustrating an embodiment of the steps involved during the training phase of the system and methods disclosed herein.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The disclosed embodiments involve a system and method that use the known ego-motion of a camera system as input into state-of-the-art neural networks to determine the optical flow field of the salient objects in the scene of the camera system. Such information is useful in situations where the goal is to determine what is moving in the scene relative to the camera, such as for systems involving a camera mounted on a mobile robotic platform. However, the system and methods disclosed herein may be used for platforms, other than robotic platforms, that have ego-state and therefore ego-motion information, such as for driverless automobiles or personal camera systems.

Optical flow is used in many research areas within computer vision, including video compression, object detection, navigation, and motion estimation. As used herein, optical flow refers to the apparent motion of pixels between consecutive images or frames in a video. Motion can come in many forms, including pixels moving in the scene and the camera or sensor moving relative to the scene. Most optical flow methods fall into two categories: sparse or dense optical flow. Sparse optical flow attempts to track the motion of some subset of pixels or regions while dense optical flow is concerned with the motion of individual pixels. The embodiments disclosed herein may apply to both sparse and dense optical flow. Optical flow operates under the two main assumptions of brightness constancy and motion smoothness. Brightness constancy refers to the observed brightness of any point on an object being constant over time. Motion smoothness refers to the assumption that nearby points in the image move in a similar manner.

FIG. 1 shows a flowchart 100 illustrating an embodiment of the steps involved during the training phase of the system and methods disclosed herein. The training phase involves training a neural network 110 to use image information combined with the ego-state information about current camera position to estimate optical flow fields in the image while ignoring the motion field due to ego-motion. The image information includes the current image 120 at this time plus some number of previous images 130. Similarly, the ego-states are the current state (pose) of the camera 140 at this time plus the state(s) of the camera at previous time(s) 150 corresponding to the previous image(s) 130. The ground truth optical flow image 160 is the term used at the current time for the image that is used for training the network.

The ground truth optical flow contains the flow of the salient objects, but does not have flow on the other pixels, even when a moving camera causes those pixels to visually flow. For training, the neural network is provided input (e.g.

image and camera pose pairs/sequences) that a user desires as well as the expected output. Over the course of using thousands of training examples, the neural network learns the weights to correctly predict the flow output expected from the image and pose inputs.

The testing phase will be able to use the complete network to estimate the optical flow in the image that is not a result of the ego-motion, thus providing salient object optical flow. During testing, the neural network can be presented with input it has not been trained upon to determine if the correct output is reached. As an example, if the system is integrated within a robot, the robot could be located in an area that it has never been.

Figure 2:
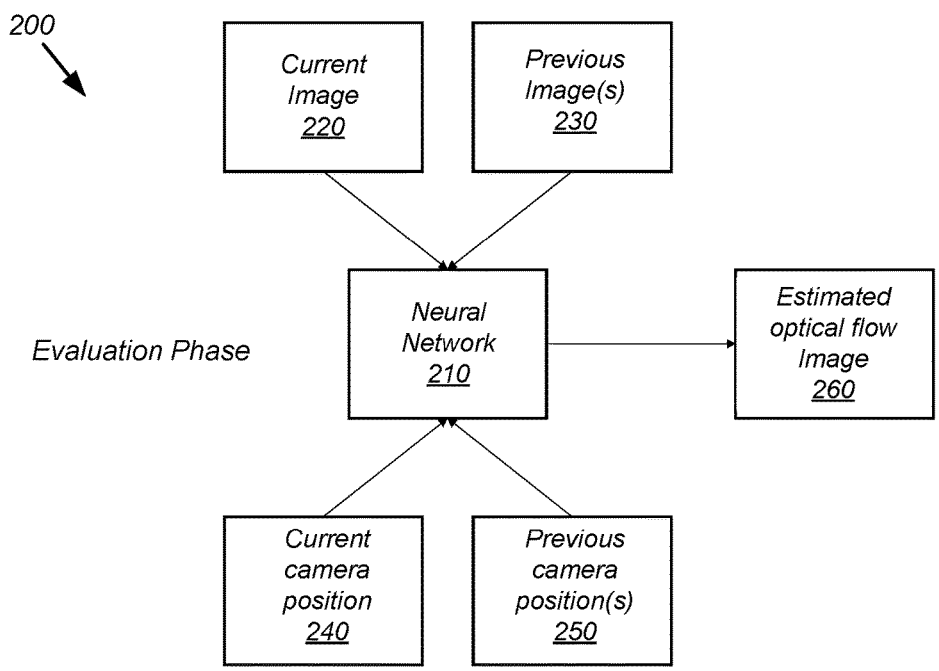
FIG. 2 shows a flowchart illustrating an embodiment of the steps involved during the evaluation phase of the system and methods disclosed herein.

FIG. 2 shows a flowchart 200 illustrating an embodiment of the steps involved during the evaluation phase of the system and methods disclosed herein. As shown, the images and ego-states are the same as in the training phase, but the output is an optical flow field at this time. Accordingly, the evaluation phase involves a trained neural network 210 that uses image information combined with the ego-state information about current camera position to estimate optical flow fields in the image while ignoring the motion field due to ego-motion. The image information includes the current image 220 at this time plus some number of previous images 230. Similarly, the ego-states are the current state (pose) of the camera 240 at this time plus the state(s) of the camera at previous time(s) 250 corresponding to the previous image(s) 230. The output of the evaluation phase is an estimated optical flow field image 260.

The previous pose and current pose provide information on how the camera moved and its movement vector. Coupled with model information about the robot and camera, this information provides how the image changed from the motion. If the neural network has the previous and current pose information as input, it can adjust the way it calculates the flow between two images to account for the camera movement.

Figure 3:
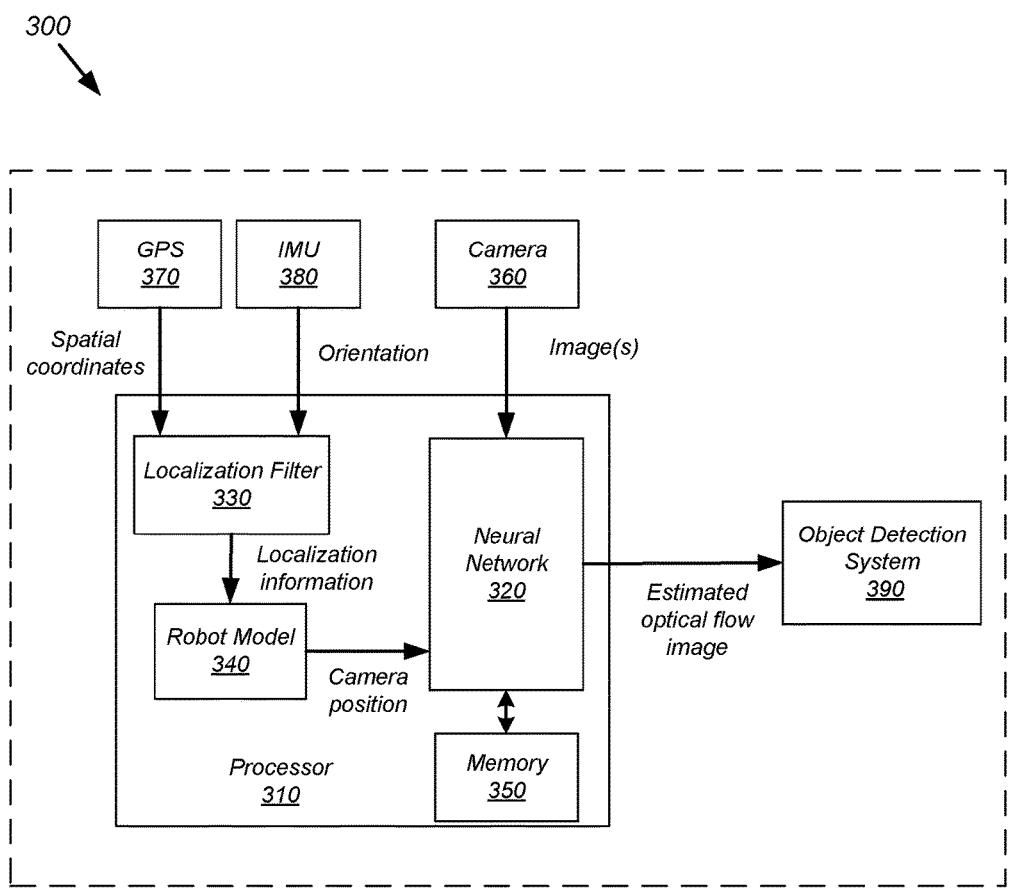
FIG. 3 shows a diagram illustrating an embodiment of a system that may be used to perform the methods disclosed herein.

FIG. 3 shows a diagram illustrating an embodiment of a system 300 that may be used to perform the methods disclosed herein. System 300 includes a processor 310 having a neural network 320, a localization filter 330, and robotic model 340 implemented therein, as well as memory 350 therein. Neural network 320 is trained the same as or substantially similar to neural network 110 shown in FIG. 1, with a trained version shown as reference 210 in FIG. 2.

Neural network 320 is operatively connected to a camera 360. As used herein, the term "camera" refers to any device configured to record visual images either in the form of photographs, films or video signals. As an example, camera 360 may be a digital camera. In some embodiments, camera 360 is connected to a platform (not shown). As an example, camera 360 may be connected to a robotic platform such as an unmanned vehicle. In some embodiments, camera 360 is moving and the platform is stationary. In some embodiments, camera 360 is stationary and the platform is moving. In some embodiments, camera 360 and the platform are both moving.

In some embodiments, the camera can only perform pan and tilt (rotational movements), whereas the platform can rotate and translate through the scene. However, the camera pose information accounts for all of these possible movements. Camera 360 provides one or more images to neural network 320, such as a current image of a scene and one or more previous images of the scene taken at different times. The scene has one or more moving objects therein, which system 300 is intended to detect the motion thereof.

The localization filter 330 receives as input sensor data that gives information about position, such as GPS, and movement, such as IMU, and it determines a filtered location by weighting the inputs based on confidence in that sensor. This localization information is combined with the robot model 340, which gives the physics and shape of the platform, to produce the camera position. As an example, the Kalman Filter is a typical method used by the localization filter 330 to process input and provide camera pose information to robot model 340. Camera pose information includes the current pose or position of the camera platform and information about one or more previous poses or positions of the camera platform that correspond to the one or more previous images provided to neural network 320. Camera pose information includes position in 3D space and orientation.

As the particular information from localization filter 330 may be platform and/or software specific, the information in robot model 340 allows for the use of a transform matrix to quickly apply the pose information of the robotic platform to the camera (because the robot model says how the camera is mounted on the platform) to allow for the determination of the camera position. The camera position information may include odometry information and/or camera pose information. The camera position is then provided as output from robot model 340 to neural network 320.

As an example, localization filter 330 and robotic model 340 may be implemented within processor 310 by computer-readable code and/or specifically-configured circuitry. Localization filter 330 may receive input from a global positioning system (GPS) receiver 370 and an inertial measurement unit (IMU) 380. GPS receiver 370 provides input such as geospatial coordinates of the platform to which camera 360 is connected to processor 310. IMU 380 may be any device capable of providing orientation information to processor 310. Suitable examples of the IMU 380 include, but are not limited to an accelerometer, a gyroscope, a magnetometer, and/or any combination thereof.

Neural network 320 uses the images and poses to determine an estimated optical flow image. In some embodiments, neural network 320 uses information/data/images/ algorithms stored within memory 350 within processor 310 as part of the process to determine the estimated optical flow image. As an example, during each time frame, neural network 320 receives one image and one camera pose. A certain predetermined number of the images and poses are then stored in memory 350. Then, when a new image/pose combination is received by neural network 320, neural network 320 may be configured to retrieve a certain predetermined number of the previous images/poses stored within memory 350.

Neural network 320 comprises many layers with weights at each layer. During training, the input images/poses attempt to produce an optical flow to match the ground truth optical flow and there is a cost function that measures how close the output is to ground truth. Over iterations of training, the algorithm attempts to shift the weights gradually to reduce the cost of the difference between the ground truth and estimated optical flow. In practice, the images/ poses are fed through the neural network and the weights determine how the input data is processed to estimate an optical flow. This estimated optical flow image output of neural network 320 is then provided from processor 310 to an object detection system 390 operatively connected to processor 310. As an example, object detection system 390 may be a desktop computer, laptop computer, mobile device, or any other computing device running software configured to receive input from processor 310 and use it for object detection purposes.

Figure 4:
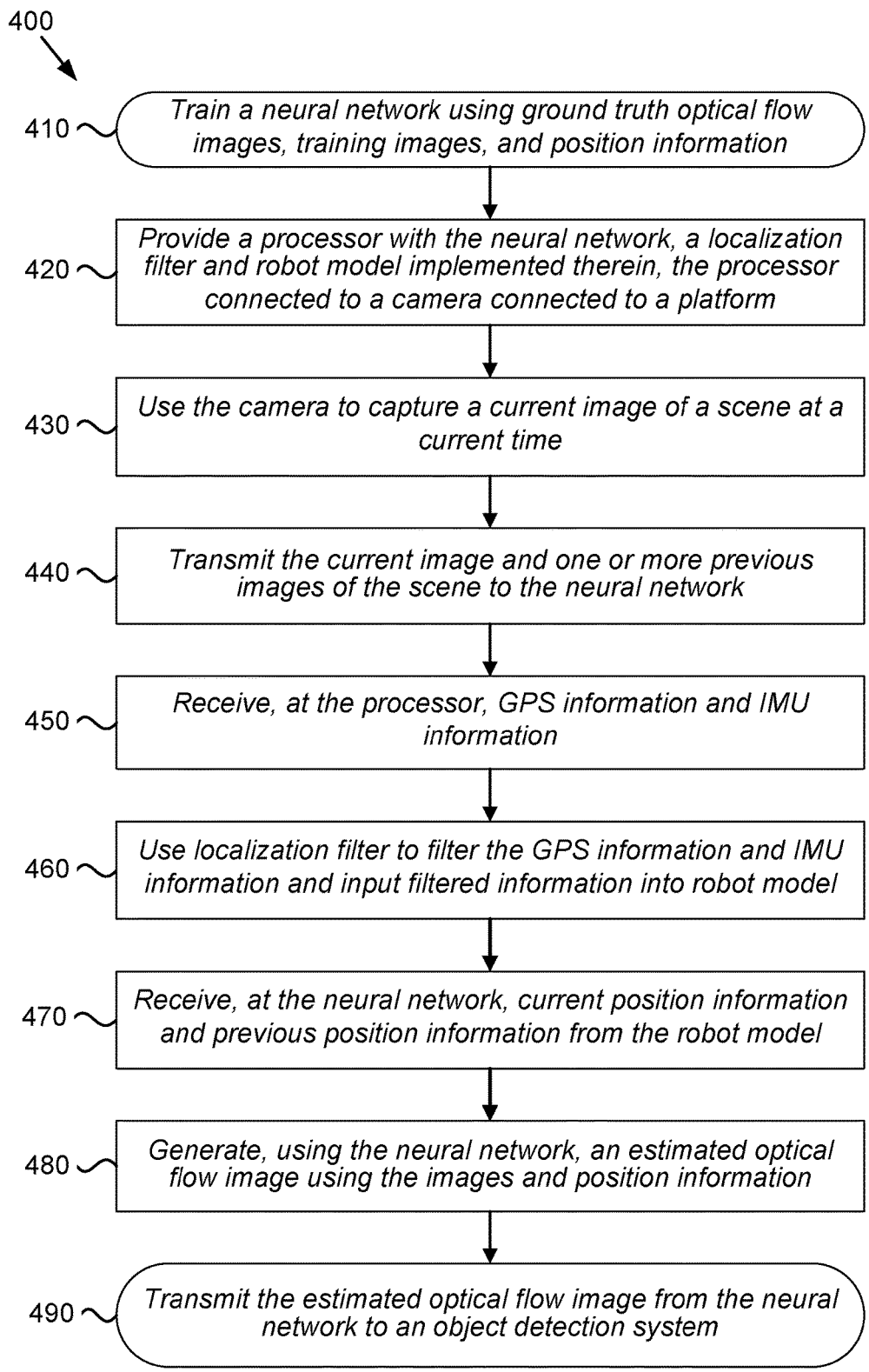
FIG. 4 shows a flowchart of an embodiment of a method in accordance with the methods disclosed herein.

FIG. 4 shows flowchart of an embodiment of a method 400 in accordance with the disclosed embodiments. Some or all of the steps of method 400 may be performed by a system such as system 300 shown in FIG. 3, with functionality as described and shown in FIGS. 1 and 2 built and incorporated into system 300. As such, reference may be made to any of the systems/methods shown in FIGS. 1-3 when discussing the embodiment of the method 400 shown in FIG. 4. Further, while FIG. 4 shows one embodiment of method 400 including steps 410-490, other embodiments of method 400 may contain fewer steps or more steps. Further, while in some embodiments the steps of method 400 may be performed as shown in FIG. 4, in other embodiments the steps may be performed in a different order, or certain steps may occur simultaneously with one or more other steps.

Method 400 may begin at step 410, which involves training a neural network 110 using a ground truth optical flow image 160, one or more training images 120, 130 of a scene having one or more moving objects therein, and position information 140, 150 corresponding to positions of the camera when the one or more training images are taken. Step 420 involves providing a processor 310 having a neural network 320, localization filter 330, and robotic model 340 implemented therein. The neural network 320 shown in FIG. 3 may be trained in accordance with neural network 110 shown in FIG. 1 and may function in the evaluation stage in accordance with neural network 210 shown in FIG. 2. Accordingly, with respect to method 400, references to neural network 110, 210, and 320 may refer to the same trained neural network. Processor 310 is operatively connected to a camera 360 connected to a platform (not shown). Only camera 360 may be moving, only the platform may be moving, or both the camera and platform may be moving.

Step 430 involves using the camera 360 to capture a current image 220 of a scene at a current time, where the scene includes one or more moving objects therein. Step 440 involves transmitting the current image 220 and one or more previous images of the scene 230 to the neural network 210. The one or more previous images of the scene 230 are taken at respective one or more previous times prior to the current time.

Step 450 involves transmitting, from a GPS receiver 370 and an IMU 380, GPS information and IMU information, respectively, to processor 310. In particular, the GPS information and IMU information is received by localization filter 330. Step 460 involves using the localization filter 330 implemented within the processor 310 to filter the received GPS information and IMU information and input the filtered localization information into the robot model 340.

Step 470 involves receiving, at the neural network 320, current position information and previous position information from the robot model 340. The current position information is the position of the camera 360 at the current time and the previous position information is the one or more positions of the camera 360 at the respective one or more previous times. Step 480 involves generating, using the neural network 320, an estimated optical flow image 260 using the current image of the scene 220, the current position information 240, one or more previous images of the scene 230, and the previous position information 250.

Step 490 involves transmitting the estimated optical flow image 260 from the neural network 320 to an object detection system 390 operatively connected to the processor 310. As an example, object detection system 390 may comprise a system configured to locate people. The moving objects within the images could give the object detection system a cue on where to look in the image. Thus, the area with optical flow would be the place where the object detection system would look and decide whether or not that moving object is a person.

Some or all of the steps of method 400 may be stored on a non-transitory computer readable storage medium, wherein the steps are represented by computer readable programming code. The steps of method 400 may also be computer-implemented using a programmable device, such as a computer-based system. Method 400 may comprise instructions that, when loaded into a computer-based system, cause the system to execute the steps of method 400. Method 400 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
  providing a processor having a neural network, localization filter, and robotic model implemented therein, wherein the processor is operatively connected to a camera connected to a platform, wherein one or more of the camera and the platform is moving;
  using the camera to capture a current image of a scene at a current time, wherein the scene includes one or more moving objects therein;
  transmitting the current image and one or more previous images of the scene to the neural network, wherein the one or more previous images of the scene are taken at respective one or more previous times prior to the current time;

receiving, at the neural network, current position information and previous position information from the robot model, wherein the current position information is the position of the camera at the current time and the previous position information is the one or more positions of the camera at the respective one or more previous times; and generating, using the neural network, an estimated optical flow image using the current image of the scene, the current position information, one or more previous images of the scene, and the previous position information;

wherein, prior to the providing step, training the neural network using a ground truth optical flow image, one or more training images of a scene having one or more moving objects therein, and position information corresponding to positions of the camera when the one or more training images are taken; and wherein the ground truth optical flow image includes a flow of salient objects but does not include a flow of other pixels even when the other pixels visually flow due to movement of the camera.

2. The method of claim 1 further comprising the step of transmitting the estimated optical flow image from the neural network to an object detection system operatively connected to the processor.

3. The method of claim 1, wherein the processor is operatively connected to a global positioning system (GPS) receiver and an inertial measurement unit (IMU), the method further comprising the step of transmitting, from the GPS receiver and the IMU, GPS information and IMU information, respectively, to the processor.

4. The method of claim 3 further comprising the step of, using the localization filter implemented within the processor to filter the received GPS information and IMU information and input the filtered GPS information and the filtered IMU information into the robot model.

5. The method of claim 4 further comprising the step of using the processor to output to the neural network, from the robot model, current position information corresponding to the current image and previous position information corresponding to the respective one or more previous images.

6. The method of claim 5 further comprising the step of generating, using the neural network, an estimated optical flow image using the current image and the associated current position information while ignoring a motion field due to ego-motion, and the one or more previous images and the respective associated previous position information.

7. The method of claim 1, wherein the step of generating, using the neural network, an estimated optical flow image is performed by using an algorithm to apply weights to the current image of the scene, the current position information, one or more previous images of the scene, and the previous position information, wherein the weights are based upon previous training of the neural network.

8. The method of claim 1, wherein the step of generating, using the neural network, an estimated optical flow image comprises using one or more of information, data, images, and algorithms stored within memory within the processor.

9. A system comprising:
a neural network;
a camera operatively connected to the neural network, the camera configured to take an image of a scene and transmit the image of the scene to the neural network; and a processor operatively connected to the neural network, the processor having a localization filter and a robot model implemented therein, wherein the processor is configured to output from the robot model current position information corresponding to the current image and previous position information corresponding to the respective one or more previous images, wherein the neural network is configured to use the current image and the associated current position information, and the one or more previous images and the respective associated previous position information to generate an estimated optical flow image;

wherein training the neural network using a ground truth optical flow image, one or more training images of a scene having one or more moving objects therein, and position information corresponding to positions of the camera when the one or more training images are taken; and wherein the ground truth optical flow image includes a flow of salient objects but does not include a flow of other pixels even when the other pixels visually flow due to movement of the camera.

10. The system of claim 9 further comprising object detection system operatively connected to the processor, wherein the processor is configured to transmit the estimated optical flow image from the neural network to the object detection system.

11. The system of claim 9, wherein the processor is operatively connected to a global positioning system (GPS) receiver and an inertial measurement unit (IMU), wherein the GPS receiver and the IMU are configured to transmit GPS information and IMU information, respectively, to the processor.

12. The system of claim 11, wherein the processor is further configured to use the localization filter implemented within the processor to filter the received GPS information and IMU information and input the filtered GPS information and filtered IMU information into the robot model.

13. The system of claim 12, wherein the processor is further configured to output to the neural network, from the robot model, current position information corresponding to the current image and previous position information corresponding to the respective one or more previous images.

14. The system of claim 13, wherein the processor is configured to use the neural network to generate an estimated optical flow image using the current image and the associated current position information while ignoring a motion field due to ego-motion, and the one or more previous images and the respective associated previous position information.

15. The system of claim 14, wherein the neural network is configured to determine an estimated optical flow image by using an algorithm to apply weights to the current image of the scene, the current position information, one or more previous images of the scene, and the previous position information, wherein the weights are based upon previous training of the neural network.

16. The system of claim 9, wherein the neural network is trained using a ground truth optical flow image, one or more training images of a scene having one or more moving objects therein, and position information corresponding to positions of the camera when the one or more training images are taken.

17. The system of claim 9, wherein the processor further comprises memory therein, wherein one or more of information, data, images, and/or algorithms is stored within the memory, wherein the processor is configured to use the stored information, data, images, and algorithms to generate, using the neural network, the estimated optical flow image.

18. A system comprising:
   a neural network;
   a camera operatively connected to the neural network, the camera configured to take an image of a scene and transmit the image of the scene to the neural network;
   a processor operatively connected to the neural network, the processor having a localization filter and a robot model implemented therein;
   a global positioning system (GPS) receiver operatively connected to the processor; and
   an inertial measurement unit (IMU) operatively connected to the processor,
   wherein the GPS receiver and the IMU are configured to transmit GPS information and IMU information, respectively, to the processor,
   wherein the processor is configured to use the localization filter to filter the received GPS information and IMU information and input the filtered information into the robot model,
   wherein the processor is configured to output from the robot model current position information corresponding to the current image and previous position information corresponding to the respective one or more previous images,
   wherein the neural network is configured to use the current image and the associated current position information while ignoring a motion field due to ego-motion, and the one or more previous images and the respective associated previous position information to generate an estimated optical flow image;
   wherein training the neural network using a ground truth optical flow image, one or more training images of a scene having one or more moving objects therein, and position information corresponding to positions of the camera when the one or more training images are taken; and
   wherein the ground truth optical flow image includes a flow of salient objects but does not include a flow of other pixels even when the other pixels visually flow due to movement of the camera.

* * * * *